(12) United States Patent
Saliba et al.

(10) Patent No.: US 6,427,934 B1
(45) Date of Patent: Aug. 6, 2002

(54) TAPE REEL FOR MINIMIZING PRINT THROUGH

(75) Inventors: George A. Saliba, Northboro; Satya Mallick, Milford; An Quach, Worcester; Chan Kim, Holliston; Neil Stanick, Whitinsville, all of MA (US); Christopher Rathweg, Lafayette, CO (US)

(73) Assignee: Quantum Corporation, Milpitas, CA (US)

( * ) Notice: Subject to any disclaimer, the term of this patent is extended or adjusted under 35 U.S.C. 154(b) by 0 days.

(21) Appl. No.: 09/191,250

(22) Filed: Nov. 12, 1998

(51) Int. Cl.[7] ............................................. G11B 15/66
(52) U.S. Cl. ..................... 242/332.7; 242/332.4; 242/349; 242/335
(58) Field of Search ............................ 242/332.7, 332.8, 242/345, 348.1, 613.2, 332.4, 532.1, 582, 349, 335

(56) References Cited

U.S. PATENT DOCUMENTS

| | | | |
|---|---|---|---|
| 3,885,751 A | * 5/1975 | Kelch et al. | 242/348.1 |
| 4,283,026 A | * 8/1981 | Werner | 242/345 |
| 4,662,049 A | 5/1987 | Hertrich | 29/267 |
| 4,720,913 A | 1/1988 | Hertrich | 29/819 |
| 5,443,220 A | * 8/1995 | Hoge et al. | 242/332.7 |
| 5,474,253 A | 12/1995 | Kasetty et al. | 242/614 |
| 5,769,346 A | 6/1998 | Daly | 242/332.4 |
| 5,803,388 A | 9/1998 | Saliba et al. | 242/348 |
| 5,979,813 A | 11/1999 | Mansbridge et al. | 242/332.4 |
| 6,050,514 A | * 4/2000 | Mansbridge | 242/332.7 |

* cited by examiner

Primary Examiner—John Q. Nguyen
(74) Attorney, Agent, or Firm—Steven G. Roeder (57) ABSTRACT

A take-up reel for use in a tape drive for minimizing print through errors, or data transfer from one layer of tape on the take-up reel to an adjacent layer of tape on the take-up reel. The take-up reel is configured to allowing portions of the buckle, coupling the take-up leader to the supply leader, to recess into the take-up reel. The relatively even and concentric configuration of leaders tape and buckle when wound onto the take-up reel prevents the application of significant non-uniform pressure to the data tape wound thereover, which reduces print through sources of data error.

20 Claims, 6 Drawing Sheets

TAPE REEL FOR MINIMIZING PRINT THROUGH

FIELD OF THE INVENTION

This invention relates generally to magnetic recording tape reels. More particularly, the present invention relates to a tape reel that reduces print through errors on data tape wound onto the reel when used in association with a buckle between the take-up leader and the supply leader.

DESCRIPTION OF THE PRIOR ART

Magnetic tapes are used for data storage in computer systems requiring data removability, high data rate capability, high volumetric efficiency, and reusability. The use of magnetic tape data storage devices is commonplace, as the cost per unit of stored data is low compared to other forms of electronic data storage, and magnetic tape devices are frequently used to back-up or preserve data stored on more expensive-non-removable disk drives.

Magnetic tape formats include open reels, tape cartridges and cassettes. In the past, it was common to use a simple open reel including a hub upon which the tape was wound and flanges that protect the edges of the tape. However, the need for additional tape protection and a desire for a reduction in the need for human intervention in installing or replacing data tapes in tape data storage devices has led to the increased use of tape cartridges and cassettes. A typical magnetic tape includes a polymer film substrate with a coating of magnetic recording material on one side, and a non-stick coating of material on the other side to reduce adhesion between layers of tape wound on a reel. In a typical tape drive using tape cartridges, the tape runs between a rotatable supply reel housed within the tape cartridge and a take-up reel in the tape drive assembly. When the cartridge is inserted into the tape drive, a take-up leader on the take-up reel is coupled to the supply leader, which is further coupled to the tape on which the data is stored. The procedure of coupling the take-up leader to the supply leader is known as buckling. Once the two leaders are coupled, the data tape is pulled through the tape path to the take-up reel by the take-up leader.

There is an increasing need for tape data storage devices that provide greater data storage capacity and higher data transfer rates. To satisfy the requirement for data storage, higher track densities on the magnetic tape are sought. The greater the track density, the greater the volume of information that may be stored on the tape. Accordingly, the width of tracks and separation between tracks has continued to decrease in order to accommodate more data tracks. However, as data tracks narrow, the signal strength from the tracks decreases. Therefore, even minor magnetic influences can mask or distort the magnetic data on a data tape sufficiently that data is lost.

There are a variety of sources of such data errors or losses. One source of data error is called print through, which results when non-uniform pressure distribution is applied to tape media as it resides on the reel. Print through is the tendency of the magnetic information stored on a layer of tape to be influenced by the magnetic data stored on an adjacent layer of tape, but will be used herein to include embossing sources of error as well. Magnetic tape in tape drives may be wound tightly. For example, in DLT™ tape drives made by Quantum Corporation, magnetic tape wound on a reel may experience pressure between 200–400 psi towards the central axis of the reel. Experimental results have shown that even small deviations from circularity of the reel may cause localized pressures experienced by the magnetic tape to exceed 1,000 psi. The non-magnetic layer of most tape, which may normally be relied on to minimize print through, is not capable of sufficiently shielding the magnetic layers of adjacent tapes in such non-uniform pressure environments. Non-uniform pressure regions can propagate outward as the reel winds additional layers of tape. This is called lateral runout, and can result in significant data loss. One source of non-uniform pressure occurs in association with the buckle between the take-up leader and the supply leader used on single-reel data tape cartridges. For example, differences between the buckle and the thickness of the take-up leader or the supply leader may create regions of uneven pressure distribution, which may result in print through.

What is needed is a take-up reel configured to reduce print through errors on tape wound thereon by improving the circularity of the surface presented for winding data tape.

SUMMARY OF THE INVENTION

Figure 2A:
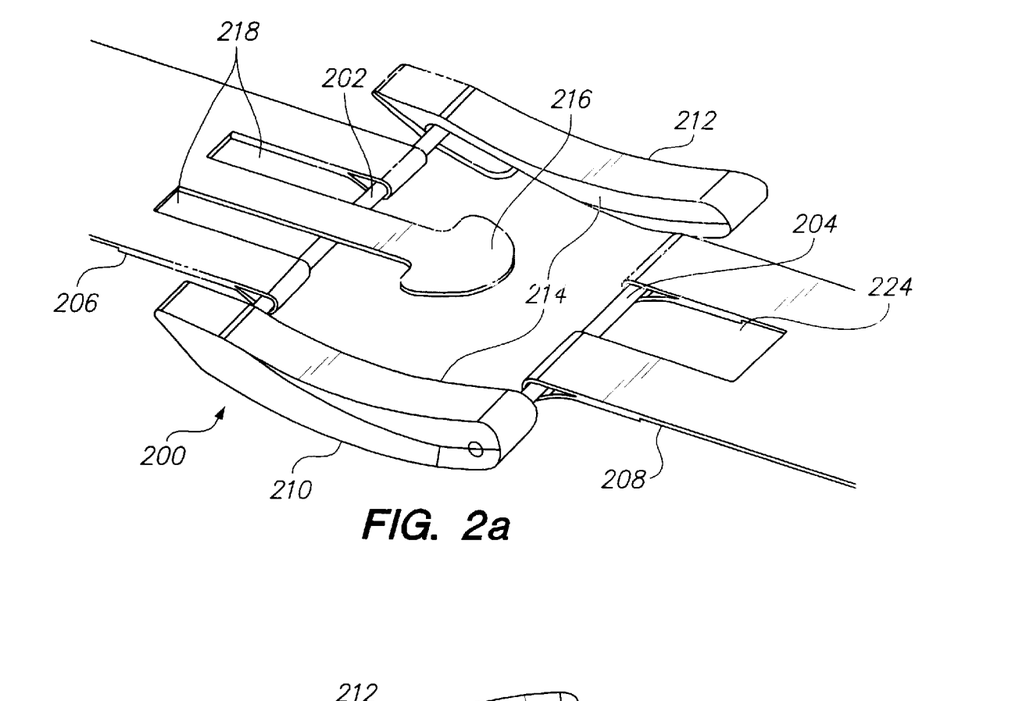
FIG. 2a is a top isometric view of a buckle for use in association with the take-up reel of the invention.
Figure 2B:
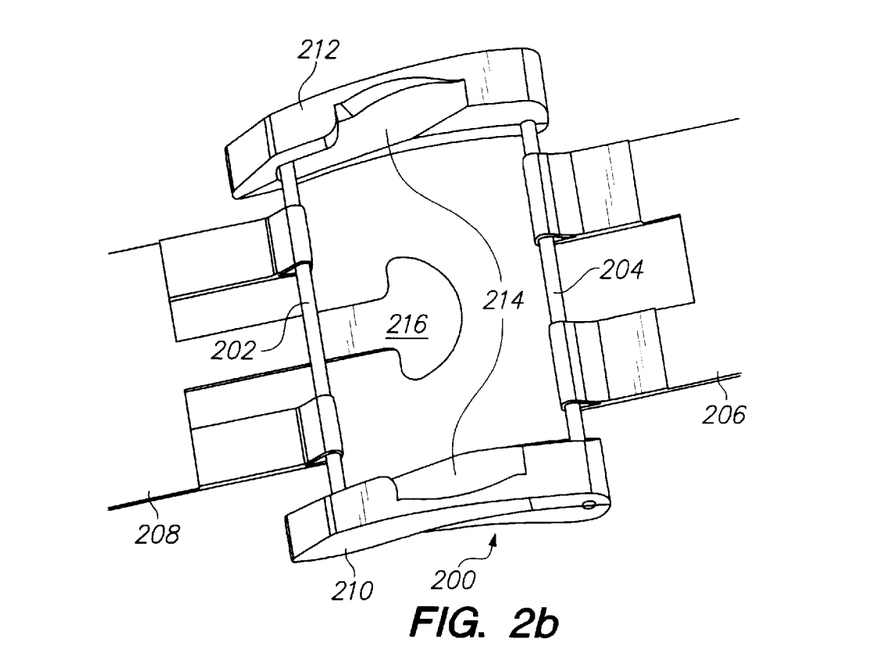
FIG. 2b is a bottom isometric view of a buckle for use in association with the take-up reel of the invention.

Accordingly, the present invention provides a take-up reel including a hub configured to improve circularity and thus reduce print through errors on tape wound thereon by allowing portions of the buckle to recess into the take-up reel. The particular configuration of the take-up reel may be adapted for use with a buckle configuration. A preferred embodiment of the take-up reel of the invention will be described for use on the buckle shown in FIG. 2. However, the invention could be easily adapted by one skilled in the art for use with other buckle configurations.

In one embodiment of the reel, the hub includes a circumferential peripheral surface with a circumference of the peripheral surface defined by a first radius. At least one raised ridge is formed on one portion of the peripheral surface of the hub with an outer surface of the ridge defined by a radius larger than the radius of the peripheral surface. The ridge preferably has a width less than the width of the peripheral surface, and includes a pair of grooves with a length perpendicular to the edge of the peripheral surface. Two flattened regions are preferably formed on each side of the ridge, meeting at a crest located at approximately the center of the arc of the ridge. The reel also preferably includes a take-up leader with apertures sized and positioned to accept the ridge or other structures on the peripheral surface of the hub.

As the buckle is wound onto the hub, at least one layer of take-up leader is preferably wound onto the peripheral surface of the hub between the buckle and the peripheral surface of the hub. Subsequent layers of tape wound thereover are supported by one or more of the following: (a) the previous layers of tape wound over the peripheral surface of the hub and the flattened regions, (b) the portions of the buckle recessed into the hub so that an outer surface of the buckle is approximately aligned with the outer surface of the ridge, (c) and the outer surface of the ridge itself. The layers of tape wound immediately over the supporting structures previously described are intended to present a surface that is highly circular for winding subsequent layers of magnetic tape, thus minimizing potential for print through as the tape is wound thereon.

DETAILED DESCRIPTION OF THE INVENTION

The present invention provides a take-up reel configured to reduce print through errors on tape wound thereon by allowing portions of the buckle to recess into the take-up reel. The particular configuration of the take-up reel may be adapted for use with a desired buckle configuration. For purposes of explanation, the take-up reel of the invention will be described for use on a buckle configuration shown in FIG. 2. However, the invention could be adapted for use with other buckle configurations. Furthermore, preferred dimensions will be given for the take-up reel of the invention configured for use in a tape drive that accepts cartridges supplying approximately 0.5 inch magnetic tape. However, one skilled in the art could easily adjust the dimensions of the take-up reel of the invention for use with data tape of different dimensions.

Figure 1:
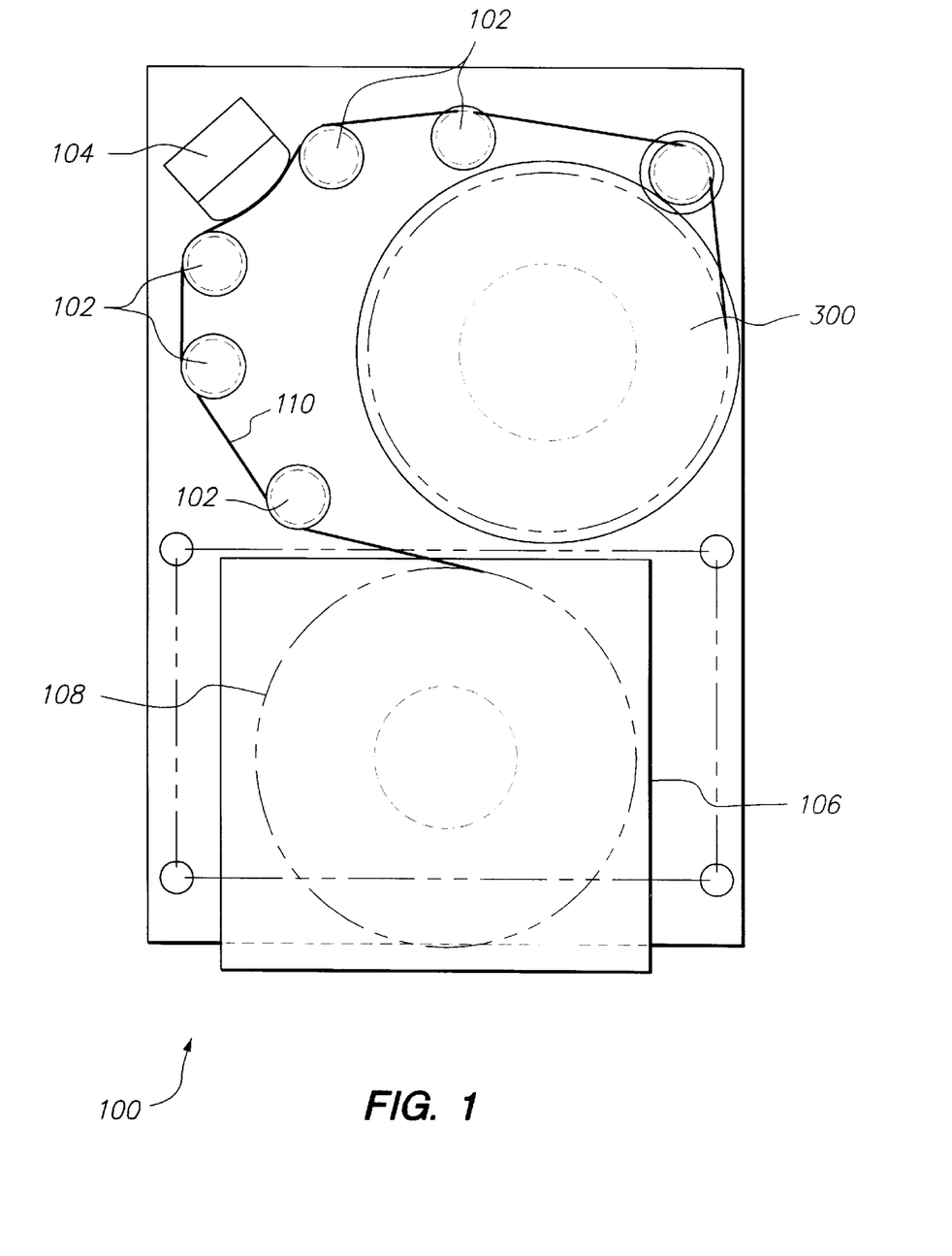
FIG. 1 is a schematic drawing of a generic tape drive using the take-up reel of the invention.

With reference to FIG. 1, a generic tape drive 100 and cartridge 106 are shown. The tape drive 100 includes the take-up reel 300 of the invention, rollers 102 and the magnetic head 104. The take-up reel 300 includes a take-up leader that is coupled to a supply leader extending from one end of data tape wound on a rotatable supply reel 108 within the cartridge 106, when the cartridge 106 is inserted into the tape drive 100. The term magnetic tape will be used hereafter to refer to both the supply leader and the data tape on which data is stored, and will be referenced by the number 110. To read or write data to the magnetic tape 110, the magnetic tape 110 is spooled between the take-up reel 300 and the supply reel 108, with rollers 102 guiding the magnetic tape 110 over the magnetic head 104. The configuration of the tape drive 100 is shown only by way of example, and the take-up reel 300 of the invention could be used in other tape drive configurations.

Referring to FIGS. 2a and 2b, the buckle 200 comprises two cylindrical components that extend through the tape path approximately perpendicular to the tape path. FIG. 2a is a top view of the buckle 200, and FIG. 2b is a bottom view of the buckle. The first cylindrical component 202 is coupled to the take-up leader 206, and the second cylindrical component 204 is couple to the supply leader 208. The first and second cylindrical components 202, 204 further extend or protrude some distance beyond the edges of the leaders 206 and 208 on each side of the tape path. The ends of the second cylindrical component 204 are pivotally coupled to a first and second hook means 210 and 212. In the embodiment shown, the hooks 210, 212 are curved in a banana shape, and include recesses 214, best seen in FIG. 2b, on each hook component 210, 212 for grabbing the protruding ends of the first cylindrical component 202 and guiding them into place. However, in alternate embodiments, other configurations of the buckle 200 may be used, with corresponding modification to the take-up reel 300 of the invention.

The cylindrical components 202 and 204 may be coupled to the ends of the leaders 206 and 208 respectively, by any known means, including forming a loop of material around the cylindrical components and affixing the layers together, as shown in FIG. 2, by use of an adhesive, heat weld, or other known means for bonding the two layers. The cylindrical components 202, 204 are preferably circular in cross section, however, other cross section shapes may be used, including oval or elliptical. The diameters of the cylindrical components 202, 204 are preferably between 0.015 and 0.050 inches, and more preferably approximately 0.025 inches. Any desired materials may be used in fabricating the buckle components, and acceptable materials for such uses are well known.

Figure 3:
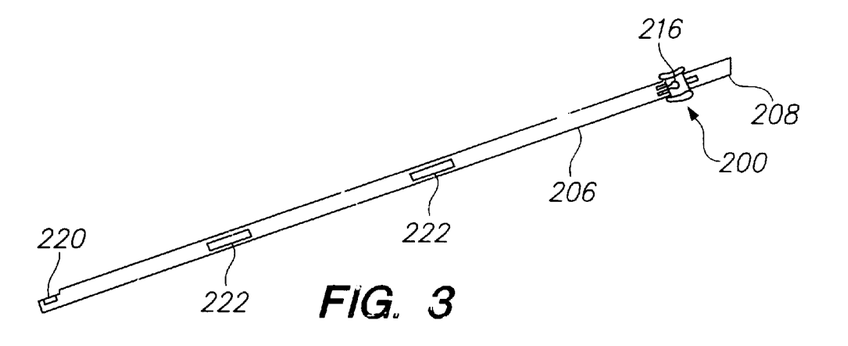
FIG. 3 is an isometric view of an embodiment of the take-up leader of the take-up reel of the invention.

FIG. 3 shows a take-up leader 206 buckled to the supply leader 208 in isolation from take-up reel 300. The materials used in manufacturing the take-up leader 206, the supply leader 208, and the magnetic tape on which data is stored (the data tape), are preferably formed of a polymer substrate such as MYLAR®, however, other materials may be used. The data tape will preferably include a magnetic coating on one side of the tape, and a non-stick coating on the other to reduce adhesion between layers of tape would on a reel. The materials used to fabricate the take-up leader 206, the supply leader 208, and the data tape may be the same or different, and acceptable tape for the various uses are commercially available. The take-up leader 206 and the supply leader 208 are preferably approximately 0.500 inches to 0.502 inches in width, and 0.005 to 0.008 inches in thickness. The data tape is preferably 0.498 to 0.500 inches wide, and 0.015 to 0.003 inches thick. In alternate embodiments different dimensions may be used. Means for joining the supply leader 206 to the data tape are well known, and any desired means for splicing the supply leader 206 to the data tape may be used. The preferred width of the take-up leader and the magnetic tape 110 is approximately 0.5 inches, which typically means that the width of the data tape will range from a maximum of 0.498 inches to a minimum of 0.496 inches. The width of the leaders 206, 208 preferably ranges between 0.500 and 0.502 inches, and the thickness between 0.004 inches and 0.008 inches, but more preferably approximately 0.0075 inches thick. The thickness of the data tape preferably ranges between 0.0001 and 0.0003 inches, and is more preferably approximately 0.0002 inches thick. However, in alternate embodiments leaders and magnetic tape of other dimensions may be used. Some changes in dimension may require that the take-up reel 300 of the invention be adapted accordingly. The mushroom shaped protrusion 216 is formed from the material used to fabricate the take-up leader 206, and is intended to provide a backward compatible means for coupling to supply leaders of older design. Gaps 218, best seen in FIGS. 2a and 2b, are formed on either side of the mushroom shaped protrusion 216 on the take-up leader 206, the use of which will be later explained. The take-up leader 206 further includes an end aperture 220 used to couple the take-up leader 206 to the take-up reel 300, and several rectangular apertures 222 that fit over structures on the outer or peripheral surface of the hub of the take-up reel 300, the uses of which will be explained in more detail below. The supply leader 208 likewise includes an aperture 224, best seen in FIGS. 2a and 2b, that fits around structures on the peripheral surface of the hub. The gaps 218 and the aperture 224 of the supply leader 208 are sometimes individually and/or collectively referred to herein as openings.

Figure 4:
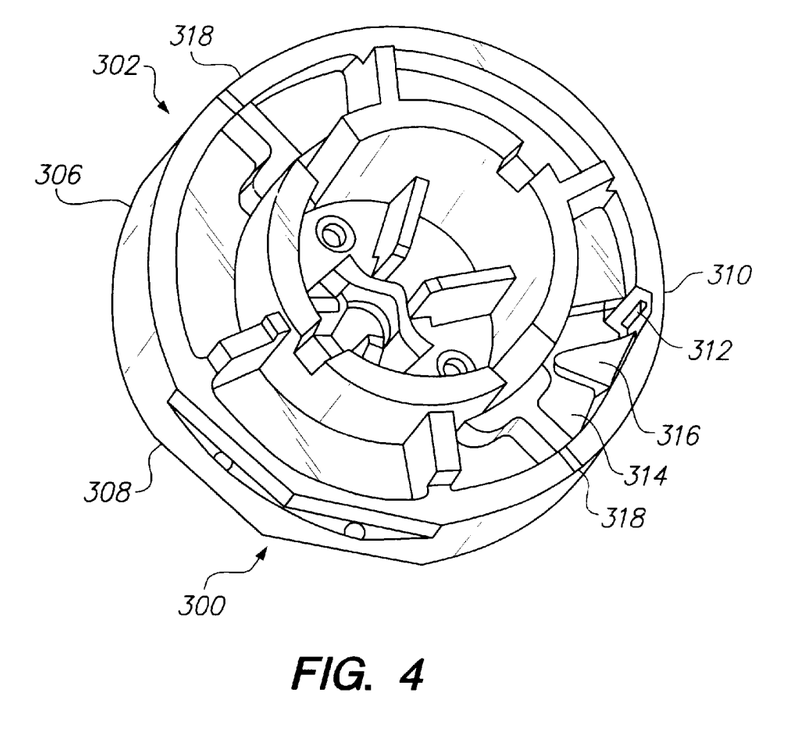
FIG. 4 is an isometric view of the take-up reel of the invention.

With reference to FIG. 4, a take-up reel 300 of the invention is shown configured for use with the buckle shown in FIGS. 2a and 2b. The take-up reel 300 preferably comprises a hub 302 with a central axis of rotation. The overall length of the hub is not critical to the invention, so long as there is enough surface to support the tape to be wound thereon, however, the length of the hub 302 along the axis of rotation is preferably between 1.0 inch and 2.0 inches, and is more preferably approximately 1.55 inches. The hub is preferably fabricated using a polycarbonate with approximately 30% glass, however, other materials may be useable. One or both ends of the hub 302 are configured to couple to a means for rotating the hub 302 around the axis of rotation 304. The configuration used to couple to the rotation means, and the rotation means used, are not critical to the invention, and any known combination of rotation means and means for coupling the hub 302 to the rotation means may be used. The hub 302 includes a circumferential or peripheral surface 306 for winding magnetic tape 110. The peripheral surface 308 is preferably slightly wider than the take-up leader 206 intended to be used in association with the take-up reel 300. For use with 0.5 inch tape, the width of the peripheral surface 306 is preferably between 0.502 inches and 0.504 inches, but more preferably approximately 0.502 inches in width, although in other embodiments, different ranges may be preferred. Preferably 75% to 95%, and more preferably approximately 82%, of the circumference of the peripheral surface 306 is defined by a first radius, with the remaining peripheral surface comprising a curved ridge 308 having an outer surface defined by a second larger radius.

The take-up reel 300 further comprises a means for coupling one end of the take-up leader 206 to the hub 302. Any known means for coupling the take-up leader to the hub 302 may be used. In an embodiment shown in FIG. 4, a slot 312 penetrates from the bottom of the hub 302 to a cavity 314 within the body of the hub 302. A hook means 316 extends from a surface of the cavity 314 around which the end aperture 220 of the take-up leader 206 is looped. One side of the notch 310 is curved gradually outward until it reaches the circumference of the peripheral surface 306 defined by the first diameter. The slope is intended to introduce the take-up leader 206 to the peripheral surface 308 without creating a sharp bend in the magnetic tape 110 that may propagate through subsequent layers. When viewed from the bottom of the hub 302, as seen in FIG. 4, the take-up leader 206 is wound in a counterclockwise direction, and thus, the gradual curve assists in minimizing the generation of uneven pressure distribution applied to the magnetic tape 110 wound thereover.

Figure 5:
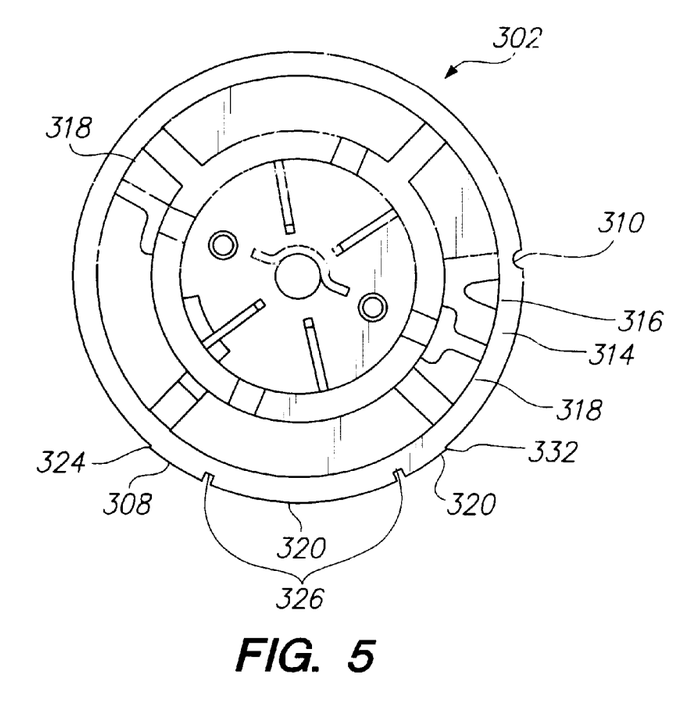
FIG. 5 is a top plan view of the take-up reel of FIG. 4.

With reference to FIG. 5, the curved ridge 308 preferably has a length between 0.06 inches and 1.30 inches, and more preferably approximately 0.095 inches. The length of the diameter defining the curved ridge 308 depends on the number of layers of take-up lead 206 that will be wound on the take-up reel 300. In a preferred embodiment of the take-up leader 206 disclosed in FIG. 3, the take-up leader 206 is designed to encounter the curved ridge 308 three times. Therefore, the preferred radius defining the arc of the curved ridge 308 is approximately three times the thickness of the take-up leader for which the hub is intended to be used. For example, if the thickness of the take-up leader 206 is approximately 0.0075 inches, then the diameter of the arc defining the curved ridge 308 is equal to the diameter defining the peripheral surface 306 plus three times 0.0075 inches.

Figure 6:
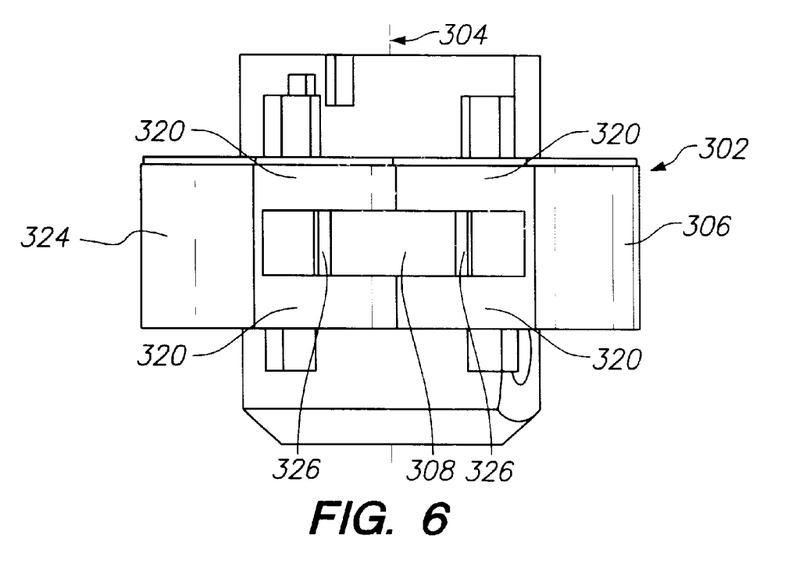
FIG. 6 is a side view of the take-up reel of FIG. 4.

A pair of flattened regions 320 cut cords across a length of the circumference of the peripheral surface 306 of the take-up reel 300 on each side of the curved ridge 308, as can be seen in FIG. 6, which is side view of the hub of FIG. 4. The pair of flattened regions 320 can be seen on each side of the ridge 308, with grooves 326 extending across the curved ridge 308 between opposite flattened regions 320. The width of the curved ridge 308 is preferably between 0.100 inches and 0.300 inches wide, and more preferably approximately 0.200 inches wide. The flattened regions 320 are preferably between 0.100 inches and 0.200 inches wide, and more preferably approximately 0.150 inches wide. The flattened regions 320 are preferably between 0.300 inches and 0.700 inches in length, and more preferably 0.500 inches in length. Because the flattened regions 320 cut a cord across the circumference of the peripheral surface 308 of the hub 302, the length of the flattened regions 320 are related to the diameter of the cylindrical components 202, 204 that must be accommodated. Referring again to FIG. 5 and also with reference to FIG. 8, the distance from the surface of the flattened regions 320 to the outer surface of the curved ridge 308, measured at the center point of each flattened region 320, is preferably four times the thickness of the take-up leader 206 or plus the diameter of the cylindrical components of the buckle; specifically, two layers of take-up leader 206 lying over the flattened regions 320, two layers of take-up leader 206, to account for the single layer of take-up leader 206 looped around the circumference of a cylindrical component 202 or 204 and therefore counting as two layers, and the diameter of the cylindrical component 202 or 204. For example, in an embodiment of the hub 302 for use with a take-up leader 206 with a thickness of 0.0075 inches, and a cylindrical component 202 with a diameter of 0.025 inches, the distance from the flattened region to an arc defined by the surface of the curved ridge 308 is approximately ((4)(0.0075))+0.0250=0.0475 inches. The calculation is the same for the gap 318 that accepts the cylindrical component 204 coupled to the supply leader 208, if, as in the preferred embodiment, the supply leader 208 is of the same thickness as the take-up leader 206.

A shoulder exists at each end of the curved ridge 308, with one shoulder designated 324, and the other 332. Each shoulder 324, 332 has a height preferably approximately three times the thickness of the take-up leader 206, so that on the third circumference of the take-up leader 206 the three layers of take-up leader 206 are approximately even with the outer surface of the curved ridge 308 at the shoulder 324 encountered by the take-up leader. Similarly, as the first layer of supply leader encounters the other shoulder 332, there are preferably 2 layers of take-up leader, and one layer of supply leader, which preferably brings the outer surface of the supply leader 206 approximately even with the outer surface of the curved ridge 308. Thus, the surface presented to the subsequent layers of supply leader 208 will be defined by an approximately uniform diameter, approximately equal to the diameter defining the arc of the curved ridge 308, preferably providing near circularity. In an embodiment using a take-up leader 0.0075 inches thick, the shoulders 324, 332 will have a height of 0.0225 inches.

Two grooves 326 are formed in the outer surface of curved ridge 308, extending approximately perpendicular to the arc of the curved ridge 308, and extending between opposite flattened regions 320 on each side of the curved ridge 308. The depth of the grooves 326 is preferably slightly larger than the diameter of the cylindrical component 202 or 204 intended to be used therewith. The openings of the groove are preferably between 0.050 inches and 0.150 inches, and more preferably approximately 0.125 inches, depending on the size of the cylindrical components 202, 204 used. The sides of the grooves 326 will preferably include relief angles between 0 degrees and 35 degrees, and more preferably 20 degrees. The grooves 326 are preferably positioned so that when cylindrical component 202 or 204 is accepted within one of the grooves 326, a centerline of the cylindrical component 202 or 204 will be approximately aligned with a center of the flattened region 320. The bottom of the grooves 326 are preferably positioned a distance from a plane defined by the associated flattened sections 320 equal to two times the thickness of the magnetic tape 110. In some embodiments, it may be preferable that the cylindrical components 202, 204 rest on the layers of take-up leader 206 lying over the flattened regions 320, to prevent any deformation of the cylindrical components 202 or 204, by forces applied by subsequent layers of magnetic tape 110.

Figure 7:
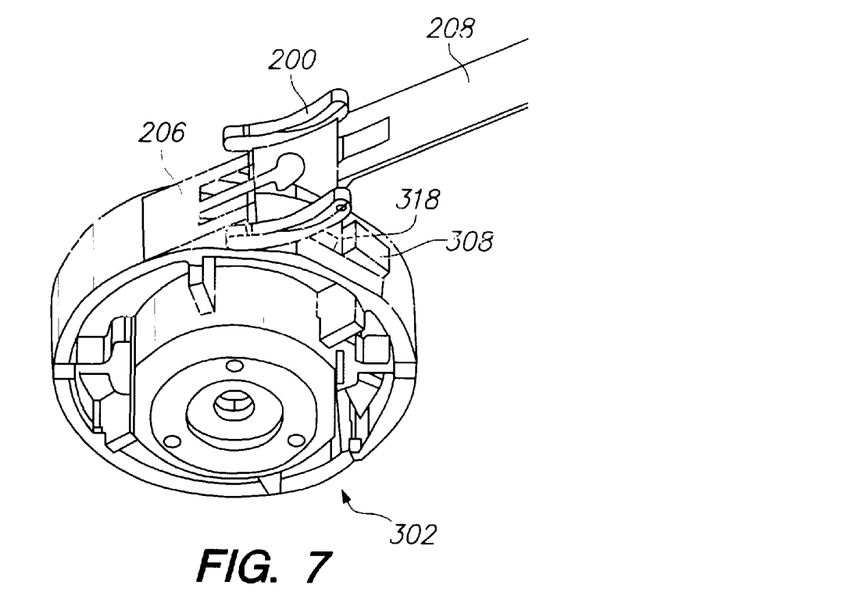
FIG. 7 is an isometric view of the take-up reel of FIG. 4 with the take-up leader coupled to the supply leader and take-up leader partially wound on the take-up reel.

Referring to FIG. 7, a take-up leader 206 of the hub 302 is shown coupled by the buckle 200 to the supply leader 208, and partially wound around the peripheral surface 306 of the hub 302. The take-up leader 206 has been wound twice around the hub 302, and the cylindrical components 202, 204 of the buckle 200 are in position to enter the grooves 326, as the take-up leader 206 is further wound onto the hub 302.

Figure 8:
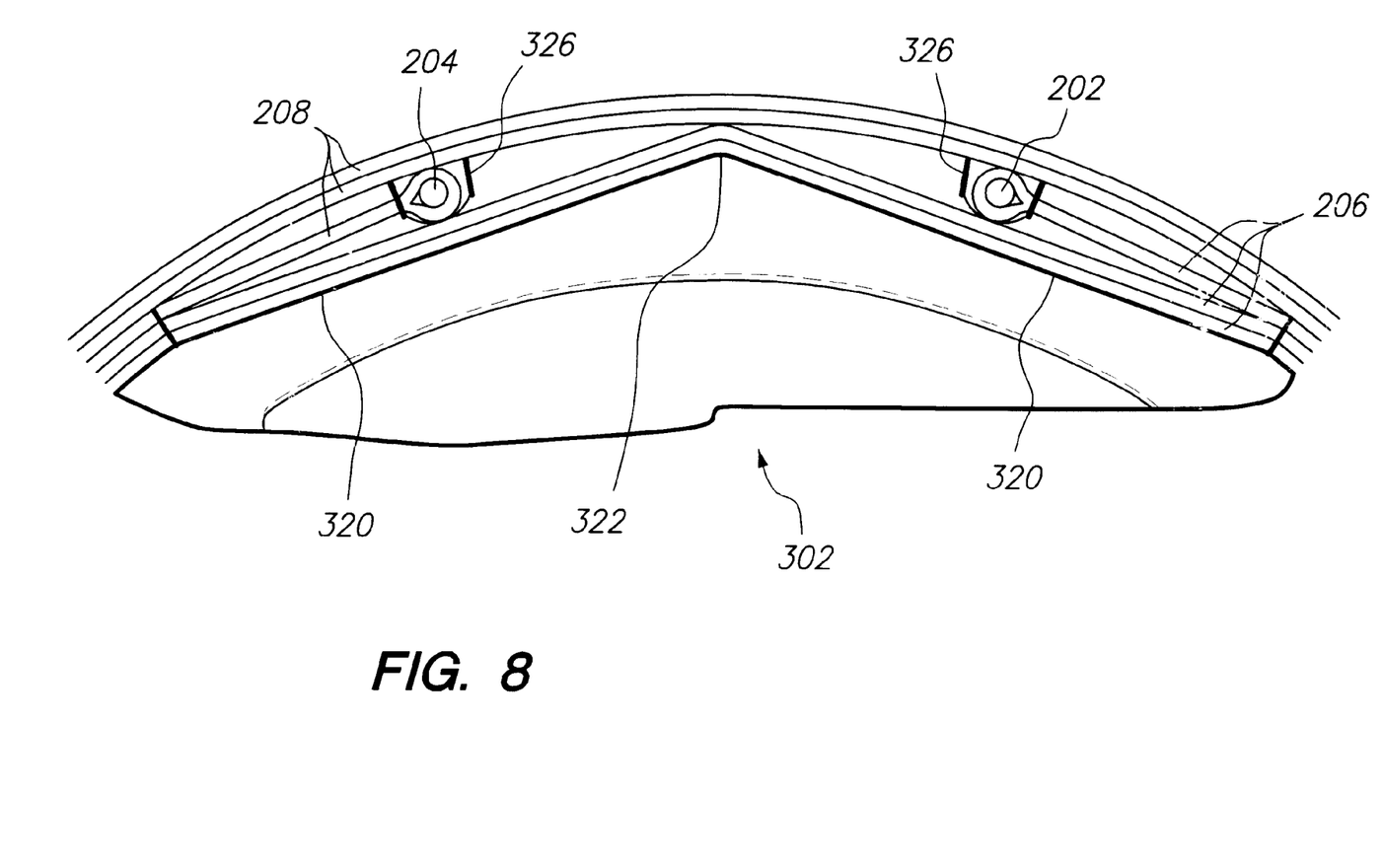
FIG. 8 is a side view of a section of the take-up reel showing several layers of take-up leader, supply leader, and data tape wound thereon.

FIG. 8 shows a side view of the hub 302 of FIG. 7 after several more revolutions of the hub 302. The cylindrical components 202, 204 of the buckle disclosed in FIG. 2a and 2b have been received within the grooves 326, and several subsequent layers of the supply leader 208 have been wrapped thereon. In the preferred configuration shown, two layers of take-up leader 206 are wound around the peripheral surface 306 of the hub 302, with the rectangular apertures 222 aligned with the curved ridge 308 so that the take-up leader 206 lies only over the flattened regions 320 on either side of the curved ridge 308. The third layer of take-up leader 206 brings the layers of take-up leader 206 approximately level with, or only slightly below, the peripheral surface of the curved ridge 308 at one of the shoulders 324. Similarly, the buckle aperture 224 of the supply leader 208 allows that supply leader 208 to lie on either side of the curved ridge 308, and the first layer of supply leader 208 brings the two layers of take-up leader 206 and the layer of supply leader 208 approximately level with, or only slightly below, the peripheral surface of the curved ridge 308. In this embodiment, it is important to allow the outer surface of the buckle 200 to recess into the hub 302 at a level equal to, or slightly below, the outer peripheral surface 306 of a nominal radius of the hub 302. In embodiments of the buckle 200 including the mushroom shaped protrusion 216, the protrusion lies over a portion of the outer surface of the curved ridge 309.

The cylindrical component 202 of the take-up leader 206 has entered one of the grooves 326, and the cylindrical component 204 of the supply leader 208 has entered the other groove 326. The ends of the cylindrical components 202 and 204 extending beyond the sides of the ridge 308 preferably rest on the previous layers of take-up leader 206 wound over the flattened regions 320 of the hub 302, although in alternate embodiments this may not be necessary. The crest 322 between the flattened regions 320 supports two layers of take-up leader 206, which brings the surface of the second layer of the take-up leader 206 approximately level with the center of the area of the curved ridge 308. The first layer of supply leader 208 is therefore supported over the arc of the curved ridge 308 by the outer surface of the curved ridge 308, the ends of the cylindrical component 202, 204 extending from the grooves 326, and the take-up leader 206 lying over the crests 322 between the pairs of flattened regions 320. The layers of supply leader 208 wound over the supporting structures previously described are intended to present a surface for data tape that is highly circular, thus minimizing potential for print through as the tape is wound thereon.

In alternate embodiments more or less layers of the take-up or supply leaders 206, 208 may be used. Specifically, in alternate embodiments, one or more than two layers of take-up leader 206 may be used prior to the buckle 200 entering the wound position, and one or more than two layers of supply leader 208 may be used.

Figure 9:
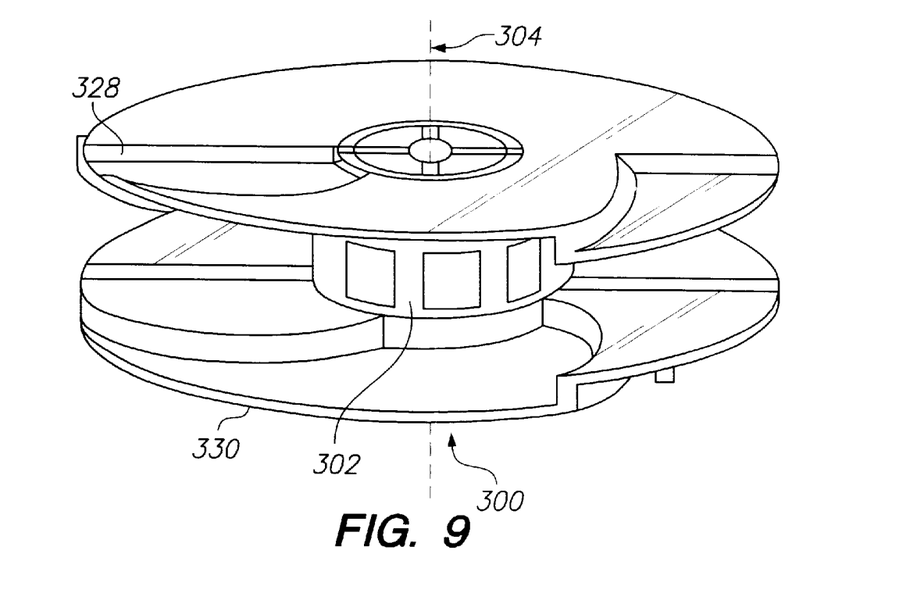
FIG. 9 is a side view of the take-up reel including guide bars and flanges.

Referring to FIG. 9, in some preferred embodiments the take-up reel 300 will also include guide bars 328 for insuring uniform stacking of the magnetic tape 11 laterally on the peripheral surface 306 of the hub 302 and flanges 330 to prevent the magnetic tape 110 from dropping significantly below a plane defined by an edge of the peripheral surface 306 of the hub 302. Preferred embodiments of the hub 302 may include a pair of grooves 318, best seen in FIG. 4, formed on opposite sides of the peripheral surface 306 of the hub 302 for partially accepting guide bars 328 preferably extending radially from central axis of the hub 302 for guiding tape wound on the hub 302 to stack uniformly. In a preferred embodiment, guide bars 328 are coupled to the hub 302 on each side of the hub 302 extending outward from the central axis 304 of the hub 302 a selected distance beyond the peripheral surface 306 of the hub 302. As the width of the peripheral surface 306 is slightly wider than the maximum width of the magnetic tape 110 used, the grooves 318 allow the guide bars 328 to be spaced more closely approximating the width of the magnetic tape 110, preferably approximately 0.502 inches. The spacing of the guide bars 328 assists the magnetic tape 110 to stack uniformly. However, the grooves 318 and guide bars 328 are not critical to the invention, and other known means for guiding the uniform stacking of tape on a reel may be used. The flanges 330 may also be provided on each side of the peripheral surface 306 of the hub 302 and extend radially from the central axis 304 of the hub 302. As guide bars 328 are used to provide uniform stacking of magnetic tape 110, the purpose of the flanges 330 is primarily to prevent any portion of the magnetic tape 110 from dropping significantly below a plane defined by an edge of the peripheral surface 306 of the hub 302 in the event that the magnetic tape 110 becomes slack. The flanges 330 are not critical to the invention, and other known means for preventing the magnetic tape 110 from dropping away for peripheral surface 306 of the hub 302 may be used.

To those skilled in the art, many changes and modifications will be readily apparent from consideration of the foregoing description of a preferred embodiment without departure from the spirit of the present invention; the scope thereof being more particularly pointed out by the following claims. The description herein and the disclosures hereof are by way of illustration only and should not be construed as limiting the scope of the present invention which is more particularly pointed out by the following claims.

What is claimed is:

1. A reel for spooling tape thereon, the reel comprising:
   a hub including a circumferential peripheral surface having a width, the peripheral surface defined by a radius, at least one ridge with an outer surface defined by a radius larger than the radius of the peripheral surface and a width less than the width of the peripheral surface, the ridge further comprising a pair of grooves with a length perpendicular to an edge of the peripheral surface, the peripheral surface further including a flattened region on each side of the ridge, the flattened regions meeting at a crest between the flattened regions; and whereby the components of a buckle are received within the grooves of the ridge, whereby deviations from a circularity of a surface presented to subsequent layers of tape wound thereon are minimized.

2. The reel of claim 1 wherein a distance between the outer surface of the ridge and the crest is approximately a multiple of a thickness of a layer of tape.

3. The reel of claim 1 further comprising a take-up leader secured to the hub.

4. The reel of claim 3 wherein the take-up leader further includes apertures sized and positioned to accept the ridge as the take-up leader is wound around the peripheral surface of the hub.

5. The reel of claim 4 wherein at least one layer of take-up leader is wound onto the peripheral surface of the hub between the buckle and a central axis of the hub.

6. The reel of claim 1 wherein the ridge includes a first end having a shoulder and a second end having a shoulder.

7. The reel of claim 6 wherein the height of the shoulders is approximately a multiple of the thickness of a layer of the tape.

8. A tape drive including the reel of claim 1.

9. A take-up reel for spooling a tape having a buckle, the take-up reel comprising:

a hub having a peripheral surface with a radius, the peripheral surface including (i) a ridge with an outer surface defined by a radius larger than the radius of the peripheral surface, and (ii) a flattened region on each side of the ridge, the flattened regions meeting at a crest that forms an angle of less than 180 degrees.

10. The take-up reel of claim 9 wherein a distance between the outer surface of the ridge and the crest is approximately a multiple of a thickness of a layer of the tape.

11. The take-up reel of claim 9 further comprising a take-up leader secured to the hub.

12. The take-up reel of claim 11 wherein the take-up leader further includes apertures sized and positioned to accept the ridge as the take-up leader is wound around the peripheral surface of the hub.

13. The take-up reel of claim 12 wherein at least one layer of take-up leader is wound onto the peripheral surface of the hub between the buckle and a central axis of the hub.

14. The take-up reel of claim 9 wherein the ridge includes a first end having a shoulder and a second end having a shoulder.

15. The take-up reel of claim 14 wherein the height of the shoulders is approximately equal to a multiple of the thickness of a layer of the tape.

16. The take-up reel of claim 9 wherein the buckle has a pair of cylindrical components, and the hub includes a pair of grooves for receiving the cylindrical components, the grooves being positioned substantially perpendicular to a longitudinal axis of the tape.

17. The take-up reel of claim 16 wherein the buckle defines an opening adjacent to at least one of the cylindrical components, and wherein the ridge includes a shoulder sized and aligned with the opening.

18. A tape drive including the take-up reel of claim 9.

19. A method for inhibiting print through of a tape having a buckle, the tape being used in a tape drive, the method comprising the step of:

providing a take-up reel including a hub and a take-up leader, the hub having a peripheral surface with a radius, the peripheral surface including (i) a ridge with an outer surface defined by a radius larger than the radius of the peripheral surface, and (ii) a flattened region on each side of the ridge, the flattened regions meeting at a crest that forms an angle of less than 180 degrees, the take-up leader including apertures sized and positioned to accept the ridge as the take-up leader is wound around the peripheral surface of the hub.

20. The method of claim 19 wherein the step of providing a take-up reel includes providing a peripheral surface having a ridge that includes a first end having a shoulder and a second end having a shoulder, wherein the height of the shoulders is approximately equal to a multiple of the thickness of a layer of the tape.

* * * * *